United States Patent [19]

Börner

[11] 4,093,319
[45] June 6, 1978

[54] TRACK CONSTRUCTION FOR TRACKED LAND VEHICLES SUCH AS TANKS

[75] Inventor: Hans G. K. Börner, Blieskastel-Mimbach, Germany

[73] Assignee: Gerlach-Werke GmbH, Germany

[21] Appl. No.: 726,110

[22] Filed: Sep. 24, 1976

[30] Foreign Application Priority Data

Mar. 19, 1976 Germany .............................. 2611681
Dec. 6, 1975 Germany .............................. 2554980

[51] Int. Cl.² ............................................ B62D 55/20
[52] U.S. Cl. .................................... 305/58 R; 305/42; 305/58 PC
[58] Field of Search ................... 305/58 R, 58 PC, 59, 305/41, 39, 53, 42, 35 R, 36

[56] References Cited

U.S. PATENT DOCUMENTS

| | | | |
|---|---|---|---|
| 2,301,954 | 11/1942 | Knox ....................................... | 305/42 |
| 2,933,351 | 4/1960 | Backhaus ............................ | 305/58 X |
| 3,582,156 | 6/1971 | Korner et al. ....................... | 305/58 X |

FOREIGN PATENT DOCUMENTS

1,680,325  10/1973  Germany ........................... 305/58 R

*Primary Examiner*—Allen N. Knowles
*Assistant Examiner*—John P. Shannon
*Attorney, Agent, or Firm*—Larson, Taylor and Hinds

[57] ABSTRACT

A track construction, provided for tracked vehicles such as tanks, comprises alternate track members and connection members which are connected together by transversely extending connecting pins. The track members each comprise first and second spaced, parallel sets of transversely extending tubular members connected together by a bridging element, the tubular members of each set being axially aligned and spaced apart laterally to form gaps therebetween. The connection members each include a wheel contacting surface, and ground contacting pads are mounted thereto on the opposite side thereof from said wheel contacting surface. The track members also each include a wheel contacting surface and preferably include ground contacting pads or the like, the ground contacting pads of the track members and the connection members being arranged in a longitudinally staggered relationship, intersecting beneath the connecting pins. Preferably, the ground contacting pads associated with the connection members are affixed to detachable parts of those members and are readily replaceable with rigid ground contacting members such as snow cleats or support ribs.

14 Claims, 14 Drawing Figures

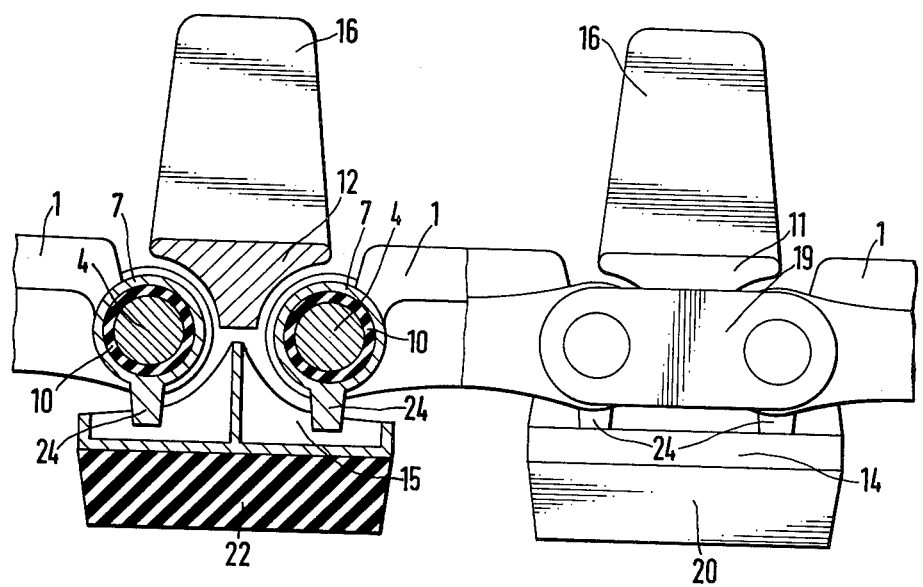
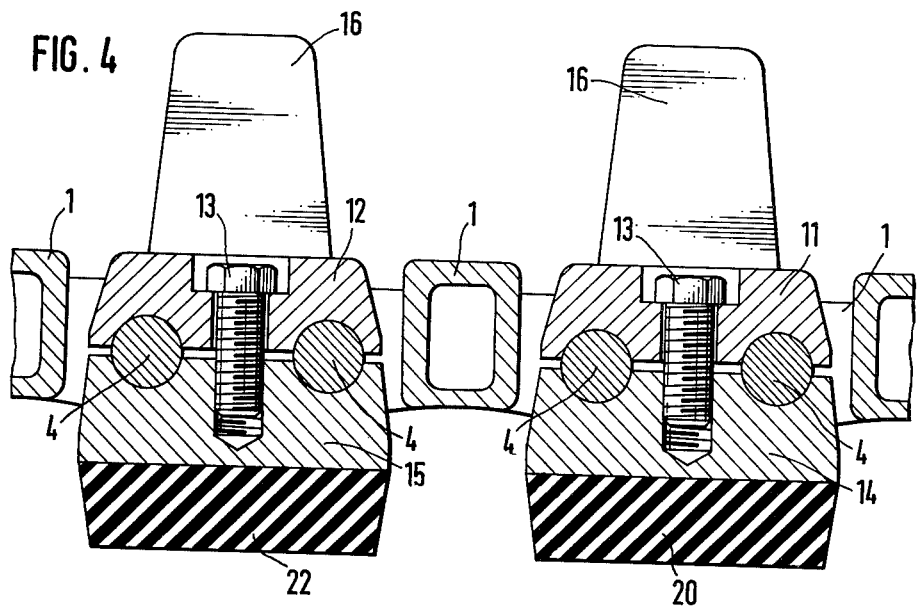

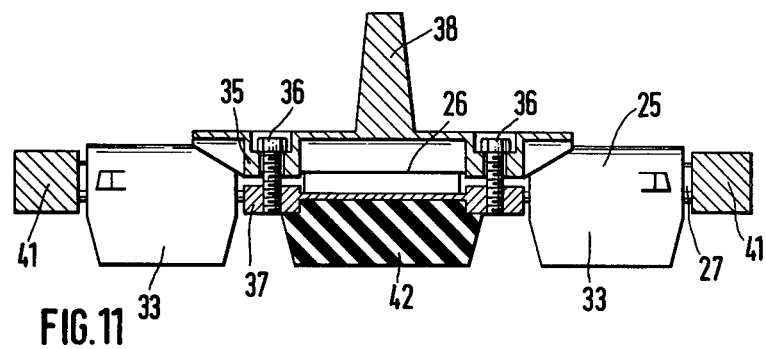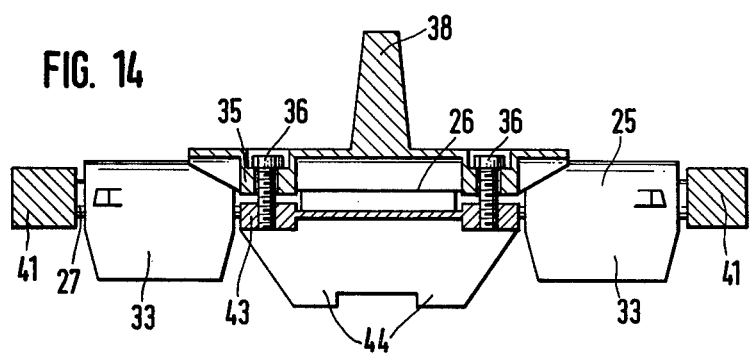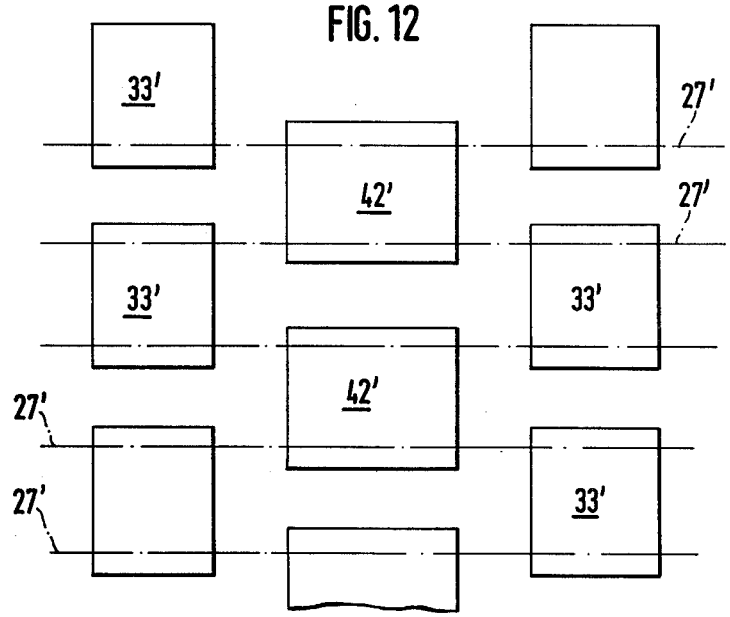

TRACK CONSTRUCTION FOR TRACKED LAND VEHICLES SUCH AS TANKS

FIELD OF THE INVENTION

The present invention relates to a track or a track construction for tracked land vehicles such as tanks, armored cars and the like.

BACKGROUND OF THE INVENTION

In one form of conventional tracks used for tanks and the like, the track construction includes so-called "double tube" or "double tubular" track members connected by transversely extending pins and by linking connectors being provided at the free ends of the pins. The track members include wheel contacting surfaces which engage the drive wheels of the vehicle. In accordance with such conventional track constructions, ground engaging pads are fixed to the underside of the track members, the mass of the ground engaging pads filling the cavity defined by what is a substantially box-shaped body portion of the track member. An improved track construction is disclosed in U.S. Pat. No. 3,591,242 (Borner). A track construction of this kind includes connection members between the track members connected with the track members by transversely extending pins. The tubes of the track members receive rubber sleeves and therein receive the connecting pins and the latter directly engage the connecting members, the rubber sleeves providing the required pivotable connection between the track members and the connecting members. The ground engaging pads fixed to the underside of the track members extend in both longitudinal directions of the track beyond the two connecting pins of the track member. A track of this kind provides particular advantages with regard to riding smoothness. In particular, whereas in previous track constructions, the drive wheels of the vehicle, in transition from one track member to the other, caused bending of the ground engaging pads and thus themselves were caused to sink in, the track of the Borner patent, through the provision of a bridging action whereby the connecting members also include wheel contacting surfaces and bear on the connection pins at a location nearer the centerline of the pads, affords a relatively even ride over the entire length of the track.

SUMMARY OF THE INVENTION

Generally speaking, the present invention is concerned with the provision of a track construction which is greatly simplified and has an increased value in use as compared with those of the prior art. In particular, the invention is concerned with simplification of the ground engaging pad assembly, the invention being directed to reducing the cost of material and labor associated with replacement of the pads, while providing a construction wherein the pad is firmly secured to the track. Moreover, in particular the invention is directed to providing a smooth, even ride. In general, the present invention concerns the provision of a track construction which is of the type discussed above and which fulfills the purposes discussed, the track construction of the invention providing for ground engaging pads which are affixed to either the connection members only, or to both the connection members and the track members. In the latter case, the ground engaging pads of the track and connection members are arranged in a longitudinally staggered pattern, intersecting beneath the connecting pins, and, in accordance with the preferred embodiment, a first set of ground engaging pads are mounted at the outboard ends of the track members and a second set of pads are mounted on the connection members in the middle thereof.

Mounting of the ground engaging pads on the connection members provides a number of advantages. In particular, the mounting can be made much simpler than the conventional mounting on a track member, particularly in view of the fact that the latter are characteristically of a complicated configuration. In this regard, in accordance with an advantageous embodiment of the invention, the connection members are constructed so as to comprise upper and lower parts that are clampingly mounted on the transverse connecting pins. The pads of the connection members provided in accordance with the invention can then be fixedly secured to the second parts, for example, by vulcanization, and still can be replaced in a relatively simple and easy manner, after they become worn, simply by replacing the lower part in question. In contrast, in such track constructions of the prior art having the pads fixedly anchored to the track member, because of the complex mounting provided, the entire track member must be replaced to replace a worn-out pad. Apart from the expense involved, this process is also a relatively cumbersome one involving as it does the necessity for driving out the connecting pins from the bores of the tubes of the track members. On the other hand, in arrangements where the pads comprise rubber elements which are detachably seated with respect to the track member, problems have occured with respect to the stability of the seat and such arrangements have generally proved to be unsatisfactory.

In accordance with a most important further feature of the invention, the combination of pads disposed on the connection members, as provided in accordance with the present invention and pads disposed in a conventional manner on the track members in a staggered, intersecting pattern, leads to further smoothing of the ride provided by the track. In particular, an operating wheel, in rolling over a track member or a connection member, will engage such a member first near the leading edge thereof, then in the middle, and the later more the trailing end. Thus, the entire load of the operating wheel is no longer supported first substantially entirely by the forward portion of the pad surface, then by the whole pad surface and later only by the rear or trailing portion of the pad surface, but is additionally supported in the vicinity of the forward and rear ends of the pads, because of the staggering and intersecting that is provided in accordance with the invention, but at least one preceeding pad or, respectively, one following pad which is also involved. The impacting or pressing in of the pads at different successive locations is thus more uniform and hence the ride provided is smoother.

In a preferred embodiment, the track members include pads disposed at the sides thereof, i.e., at the outboard ends, and the connection members, which are generally more narrow, mount the pads in the middle thereof.

As discussed above, the connection members are preferably composed of an upper part and a lower part, and, in accordance with a further aspect of the invention, replaceable or exchangeable parts are provided so that the pads can be readily replaced by rigid ground engaging members such as snow cleats, ice spikes, supporting ribs for combat tracks, and the like. In accordance with this embodiment, these ground engaging members also extend in both longitudinal directions of the track beyond the two pins of the connecting body. If the track is to be rapidly reequipped as a combat track, the track members will be supplied with supporting ribs and the exchange of the lower parts in this instance can also be provided individually for different connecting locations.

Advantageously, the track members and connection members are continuous across the cross-section of the track although at least one of the two members may consist of a plurality of individual elements distributed over the cross-section of the track.

The connection members preferably engage the pins between the ends of the pins, individual, conventional linking connectors being provided at the free ends of the pins. However, the connection members may also be designed to extend across the whole width of the track and the pins can also be connected at the ends by the connection members themselves. In accordance with this latter embodiment, the pads can thus extend across the entire width of the track.

The pins themselves are, advantageously, directly secured to surrounding rubber sleeves so as to prevent wear associated with the play resulting if loose fit is provided between these parts. The guide teeth of the track are preferably mounted on the connection members so that transverse stresses are taken up through the shorter route provided by way of the pad to the ground itself.

Other features and advantages of the invention will be set forth in, or apparent from, the detailed description of preferred embodiments of the invention found hereinbelow.

BRIEF DESCRIPTION OF THE DRAWINGS

FIG. 4 is a section taken generally along line IV—IV of FIG. 1 and drawn to an enlarged scale;

FIG. 5 is an end view, partially in section, taken generally along line V—V of FIG. 1 and drawn to an enlarged scale;

FIG. 11 is a section taken generally along line XI—XI of FIG. 7;

FIG. 12 is a diagram of the imprint left by a track in accordance with the invention;

FIG. 14 is a section view similar to that of FIG. 11 with a new part substituted therein.

DESCRIPTION OF THE PREFERRED EMBODIMENT

Figure 1:
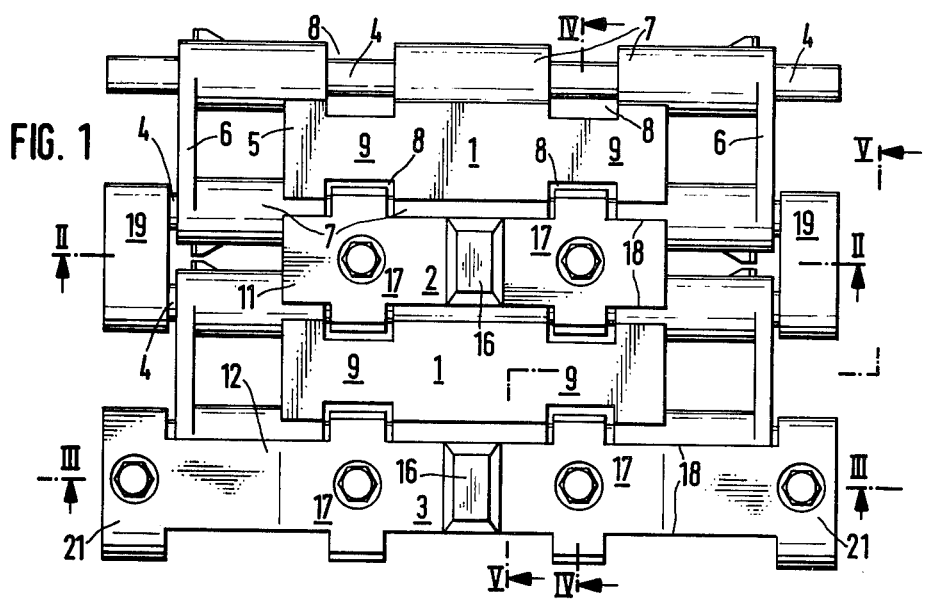
FIG. 1 is a plan view of a track construction in accordance with the invention, the construction illustrated utilizing connection members in accordance with two different embodiments of the invention.

Referring to FIG. 1, a track construction is illustrated which comprises, as viewed from the top downward in FIG. 1, a first track member 1, a connection member 2 in accordance with one embodiment of the invention, a further track member 1, and a further connection member 3 in accordance with a further embodiment of the invention. Track members 1 and connection members 2 and 3 are interconnected in a manner described in more detail hereinbelow, through mutual engagement and by means of transverse connecting pin 4.

Track members 1 each comprise first and second pairs or sets of parallel tubular members or tubes 7, the sets being rigidly interconnected to each other by a central bridging member or bridge 5 and first and second lateral connecting bars 6. Each set of tubes 7 comprises three tubes which are in axial alignment and which are spaced apart to form discontinuities or gaps 8. Thus, track members 1 are of the "double tube" or "dual tube" type comprising two pairs of three, equal length, equally spaced mutually aligned tubes 7 defining gaps 8 therebetween. The bridge 5 includes first and second flat wheel contacting surfaces 9 on opposite sides of the centerline of the track.

As shown in FIG. 5, pins 4 are received in resilient sleeves 10 fabricated of rubber or the like, and sleeves 10 are themselves received in the bores formed by tubes 7. Resilient sleeves 10 are fixedly secured in position within tubes 7 and, similarly, pins 4 are fixedly secured within sleeves 10.

Figure 2:
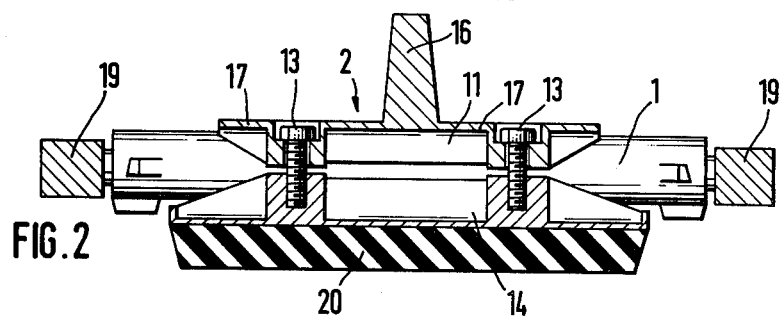
FIG. 2 is a section taken generally along II—II of FIG. 1 illustrating a first embodiment.

Referring to FIG. 2, connection member 2 comprises an upper part 11 having a lower part 14, clampingly secured thereto by means of bolts 13. Parts 11 and 14 are formed so as to mate with reciprocally shaped surfaces of pins 4, bolts 13 serving to clamp parts 11, 14 to pins 4 in the gaps 8 between tubes 7 of track members 1. Flat wheel contacting surfaces 17 are defined by upper parts 11 on opposite sides of the centerline of the track. Connection member 2 also includes an upwardly projecting guide tooth 16 located in the middle thereof. The edges 18 of wheel engaging surfaces 17 lie approximately over the longitudinal axes of the pins 4 as illustrated in FIG. 1.

Figure 3:
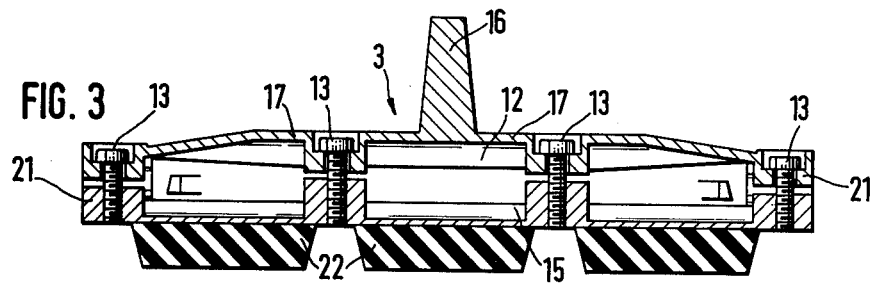
FIG. 3 is a section taken generally along line III—III of FIG. 1 illustrating the second embodiment.

Referring to FIG. 3, a second embodiment of the connection members is illustrated. This embodiment is similar to that of FIG. 2 and comprises an upper part 12 connected to a lower part 15 by means of bolts 13 which, again, clamp these parts onto pin 4. Other differences between the two embodiments will be discussed hereinbelow.

As illustrated in FIGS. 1 and 2, in accordance with the embodiment of FIG. 2, the free ends of the pins 4 are connected together by end connectors 19 of a known construction. These free ends of pins 4 extend beyond the ends of tubes 7 on opposite sides thereof and connectors 19 join pins of adjacent track members between which the connection member 2 is disposed. As illustrated in FIG. 2, a ground engaging pad is directly connected to the lower surface of lower part 14 such as by vulcanization.

Referring again to FIG. 3, in this embodiment the connectors 19 are replaced by outboard portions 21 of upper and lower parts 12 and 15, these outboard connecting portions being joined together by bolts 13 as illustrated. In this embodiment, three separate pads 22 are vulcanized to the undersurfaces of lower part 15 as shown in FIGS. 3, 4 and 5.

Figure 6:
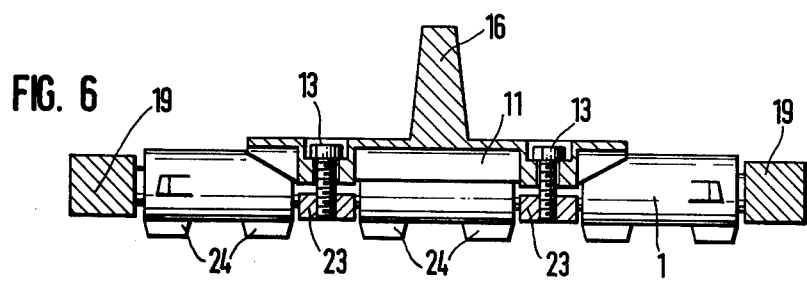
FIG. 6 is a section similar to that of FIG. 2 wherein parts have been replaced in accordance with a further embodiment.

Referring to FIG. 6, an embodiment is illustrated wherein the track of FIGS. 1 to 5 is re-equipped as a combat track. More specifically, in this embodiment, the lower parts 14 and 15 of connection members 2 and 3 are exchanged for lower part 23. In particular, individual connecting parts 23 are provided which are separate from one another and which exclusively perform a connecting function, that is, serve only to clamp the associated upper part 11 (or 12) to corresponding pins 4 and do not include ground engaging means. Further, in this embodiment, tube members 7 of track members 1 include downwardly depending support ribs 24 and thus track members 1 include the only ground engaging portions of the track. As illustrated in FIG. 5, lower parts 15 of connection member 3 are configured such as to provide a space thereabove for downwardly depending support ribs 24 and hence the track construction can readily be converted to a combat track simply by removing the lower parts 15. Similar remarks, of course, apply to the connection member 2 of the embodiment of FIG. 2. As illustrated, the height of support ribs 24 is such that ribs 24 are inoperative, i.e., do not engage the ground, when the lower parts 14 or 15 are in place (see FIG. 2).

Figure 7:
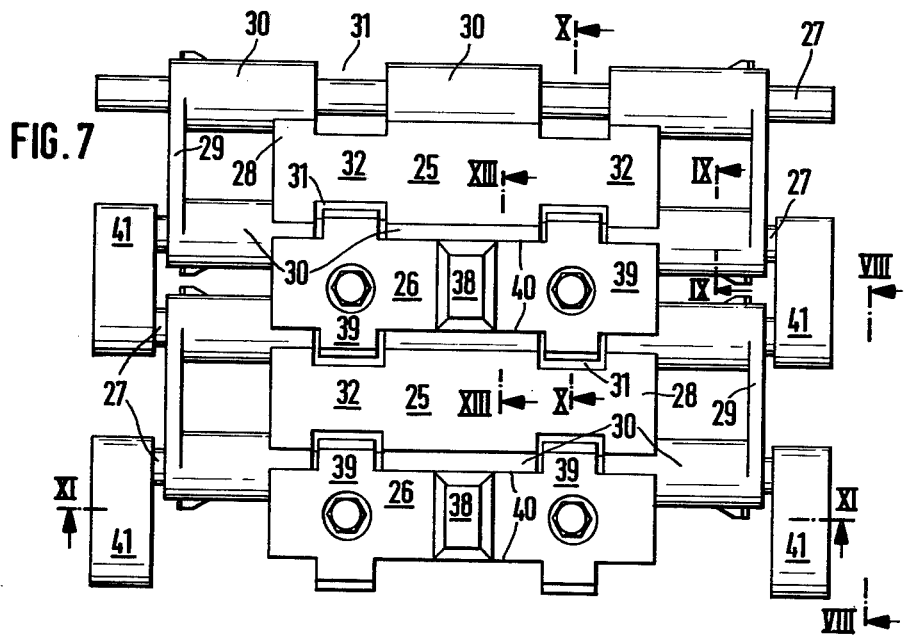
FIG. 7 is a plan view similar to that of FIG. 1, the track construction illustrated employing connection members in accordance with two further embodiments of the invention.
Figure 8:
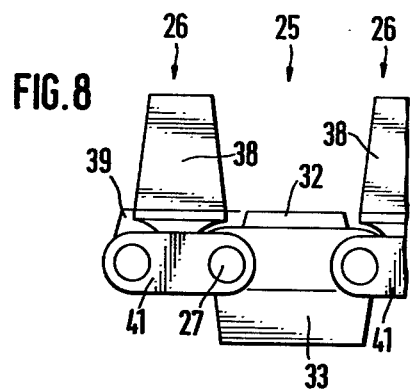
FIG. 8 is an end view taken generally along line VIII—VIII of FIG. 7.
Figure 9:
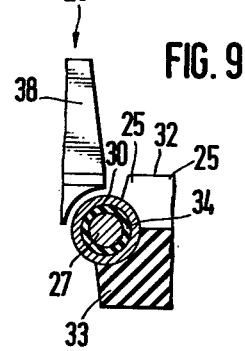
FIG. 9 is a section taken generally along line IX—IX of FIG. 7.

Referring to FIG. 7, a further embodiment of the track construction of the invention is provided which comprises, as viewed from the top of the figure, a first track member 25, a first connection member 26, a second track member 25, and a second connection member 26. The track members 25 and connection members 26 are interconnected by pins 27 in a manner similar to the embodiment of FIG. 1 discussed hereinabove.

Track members 25 are similar to those of FIG. 1, and comprise two parallel sets of tubes 30 rigidly interconnected by a bridge 28 and a pair of lateral bars 29, the tubes 30 being spaced apart or interrupted to form gaps 31 therebetween. Bridge 28 defines flat wheel engaging surfaces 32 on opposite sides of the centerline of the track. As illustrated, first and second pads 32 are mounted on track members 25 on the undersides thereof. The resilient mass of each pad 33 is anchored in a cavity formed by the substantially box-like body portions of corresponding track member 25. Pins 27 are received in resilient sleeves 34 which are, in turn, received in tubes 30, the sleeves 34 being fixedly seated in tubes 30 and pins 27 being fixedly seated in sleeves 34.

Figure 10:
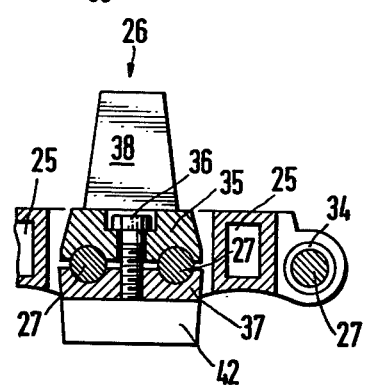
FIG. 10 is a section taken generally along line X—X of FIG. 7.

As perhaps can best be seen in FIGS. 10 and 11, connection members 26 each comprise an upper part 35 and a lower part 37 fixed thereto by a bolt 36. As in the embodiments described above, the upper part 35 and lower part 37 are clampingly mounted on pin 27 by means of bolts 36. In this regard, the parts 35, 37 extend in to the region of gaps 31 of tubes 30 of track members 35. Wheel contacting surfaces 39 are formed on upper parts 35 on opposite sides of the centerline of the track while a track guide tooth 38 projects upwardly from the middle of upper part 35. The edges 40 of the wheel contacting surfaces 39 are disposed approximately above the longitudinal axes of pins 28. The two pins 27 which are interconnected by a connection member 26 are also interconnected by individual clamp-on type connectors 41 that are similar to those of FIG. 1 and of a conventional construction. Connection body 26 is further provided with a ground engaging pad 42 vulcanized onto the undersurface of lower part 37.

In accordance with an important aspect of the invention referred to above, the pads 35 of the track members 25 are disposed on the sides of the track, i.e., at the outboard portions thereof, while pads 42 of the connection members 26 are located in the middle of those members. As is illustrated in FIG. 12, wherein chain lines 27' represent the axes of pins 27 and rectangles 33' and 42' represent the imprints left by pads 33 and 42, respectively, the pads are staggered in relationship to one another in the longitudinal direction of the track. With this arrangement, the closer the location of the load provided by an operating wheel to the front or rear of pads 33 or pads 42, the greater the accompanying load carried by pins 27 on the next adjacent pad 42 or pads 33, this meaning that the loading on the pads is more evenly distributed as compared with the prior art constructions and the pads do not sink as far into the ground in the transition of the wheels from one member to the next.

Figure 13:
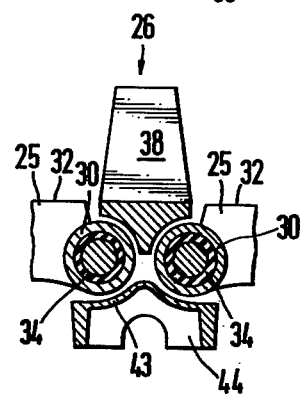
FIG. 13 is a section view taken generally along the XIII—XIII of FIG. 7 after one of the parts shown in the embodiment of FIG. 10 has been replaced.

Referring to FIGS. 13 and 14, an embodiment of the invention is illustrated wherein rapid change-over or conversion of the track is provided for use in snow and ice, mud or the like. Specifically, lower part 37 of the connecting member 26, together with associated pad 42, is replaced by an under part or lower part 43 which includes gripping members in a form of cleats, ice spikes or the like. As illustrated in FIG. 13, these gripping members 44 also extend in the longitudinal direction beyond both associated pins 27, that is, the length of gripping members 44 in the direction of the tracks is greater than the straight line distance between the furthermost points of the pins 27 in that direction.

Although the invention has been described relative to exemplary embodiments thereof, it will be understood that other variations and modifications can be effected in these embodiments without departing from the scope and spirit of the invention.

I claim:

1. A track construction for land vehicles, such as tracked armored vehicles, said track construction comprising:

a plurality of track members each comprising first and second spaced, parallel sets of transversely extending tubular members, said sets each comprising at least two tubular members mounted in axially spaced relationship so as to define a gap therebetween and having axially aligned bores therein, said track members each including a wheel contacting surface located thereon;

a plurality of connection members each including a wheel contacting surface;

and connecting means, including a pair of connecting pins extending through resilient sleeves mounted in said aligned bores of said sets of tubular members, for connecting said connection members and said track members together in alternating relationship to form a track, said connection members including ground engaging means affixed thereto on the sides thereof opposite to said wheel contacting surfaces and extending in both longitudinal directions of the track beyond the two connecting pins of the connection member.

2. A track construction as claimed in claim 1 wherein said ground engaging means comprises a pad member.

3. A track construction as claimed in claim 2 further comprising pad members affixed to said track members on the sides thereof opposite to said wheel contacting surfaces and extending in both longitudinal directions of the track beyond the two connecting pins of the track member, said pad members of said connection member and said pad members of said track members being staggered longitudinally with respect to one another.

4. A track construction as claimed in claim 3 wherein said pad members of said track members comprise pads arranged at outboard portions thereof and said pad members of said connection members comprise pads arranged in the middle thereof.

5. A track construction as claimed in claim 4 wherein each of said track members comprises a pair of pads arranged at opposite outboard ends thereof and each of said connection members comprises one pad.

6. A track construction as claimed in claim 1 wherein said connection members comprise upper parts and lower parts, and means for clampingly connecting said upper and lower parts to said pins.

7. A track construction as claimed in claim 6 wherein said ground engaging means comprises pad members which are affixed to the lower parts of said connection members by vulcanization.

8. A track construction of claimed in claim 6 wherein said ground engaging means comprise rigid ground engaging members.

9. A track construction as claimed in claim 1 wherein said pins are directly seated in said resilient sleeves.

10. A track construction as claimed in claim 1 wherein the connecting members are continuous across the cross-section of the track construction.

11. A track construction as claimed in claim 1 wherein said connection members each include a projecting guide tooth secured thereto.

12. A track construction as claimed in claim 1 wherein said track members are continuous substantially across the cross-section of the construction.

13. A track construction for land vehicles, such as tracked armored vehicles, said track construction comprising:
a plurality of track members each comprising first and second spaced, parallel sets of transversely extending tubular members, said sets each comprising at least two tubular members mounted in axially spaced relationship so as to define a gap therebetween and having axially aligned bores therein, said track members each including a wheel contacting surface located thereon;
a plurality of connection members each including a wheel contacting surface;
and connecting means, including a pair of connecting pins extending through resilient sleeves mounted in said aligned bores of said sets of tubular members, for connecting said connection members and said track members together in alternating relationship to form a track, said connection members including removable non-ground engaging members which are replaceable with ground engaging devices and which are detachably secured to said connection members engaging on the sides thereof opposite to said wheel connecting surface so as to convert the track construction into a combat track, said track members including ground engaging members comprising supporting ribs which are of such a height relative to the ground engaging devices as to be spaced from the ground when the non-ground engaging members are replaced by said ground engaging devices.

14. A track construction as claimed in claim 13 wherein said exchange parts are provided individually for the different gaps.

* * * * *